(No Model.)
A. WILCOX.
Clamp for Harrow Frame.
No. 231,637.                    Patented Aug. 24, 1880.
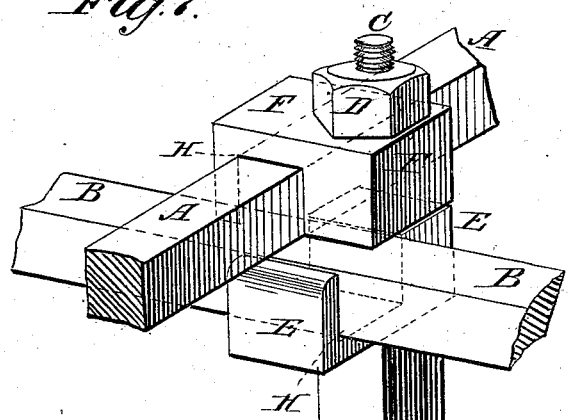
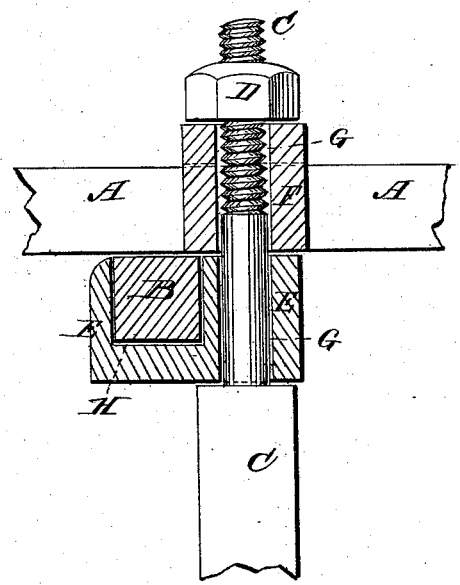
WITNESSES:
Francis McArdle.
C. Sedgwick
INVENTOR:
A. Wilcox
BY Munn & Co
ATTORNEYS.

UNITED STATES PATENT OFFICE.

ALBERT WILCOX, OF CLARENCE, IOWA.

CLAMP FOR HARROW-FRAMES.

SPECIFICATION forming part of Letters Patent No. 231,637, dated August 24, 1880.

Application filed March 5, 1880. (No model.)

*To all whom it may concern:*

Be it known that I, ALBERT WILCOX, of Clarence, in the county of Cedar and State of Iowa, have invented a new and useful Improvement in Clamps for Harrow-Frames, of which the following is a specification.

Figure 1 is a perspective view of the improvement. Fig. 2 is a sectional elevation of the same.
Similar letters of reference indicate corresponding parts.

The object of this invention is to save labor in the construction of harrow-frames and avoid weakening the bars of the frames in securing them together.

The invention consists in combining harrow bars and teeth with their clamps, so that by the loosening of a single nut the bars may be placed at any desired angle to each other, or the teeth placed at a greater or less distance apart.

I will describe the improvement as applied to the bars of a harrow-frame.

A B represent two rectangular bars, which cross each other at an angle and are to be firmly secured together.

C represents a tooth, which has a round screw-threaded shank upon its upper end to receive a nut.
D E F are two or more clips of malleable iron, which form the clamp. Each of the clips E F has a hole, G, through one end to receive the shank of the tooth, and in the side of the other end, and at right angles with the hole G, is formed a notch or groove, H, of such a size as to receive and fit upon one of the bars A B.

In applying the clamps the clips E F are placed upon the bars A B at their point of intersection, with the notches or grooves H toward each other, and with their perforated ends directly over each other, so that the tooth C may be passed through both holes G. The nut D is then screwed on, clamping the
bars A B to each other firmly and securely.

With this construction the clips E F may be adjusted to the bars A B at whatever angle the said bars cross each other. With this construction also the labor of boring, drilling,
or punching holes in the bars A B is avoided, and at the same time the bars A B are not weakened by having holes bored, punched, or drilled through them.

I am aware that it is not broadly new either to clamp the bars of a harrow so that they may be adjusted at different angles or to attach the teeth so that they may be set at different distances apart; but

What I claim as new and of my invention is—

The combination of the angular harrow-bars A B, the clamps E F, recessed to receive them, and the shouldered tooth C, having round screw-threaded shank and nut, whereby the series of teeth may be adjusted and the tooth-bars set rigidly at different angles, as described.

ALBERT WILCOX.

Witnesses:
THOS. COATES,
S. S. CROCKER.